Nov. 13, 1934.　　　　　F. C. REED　　　　　1,980,827
APPARATUS FOR THE PRODUCTION OF CARBON BLACK
Filed April 8, 1931　　　3 Sheets-Sheet 1
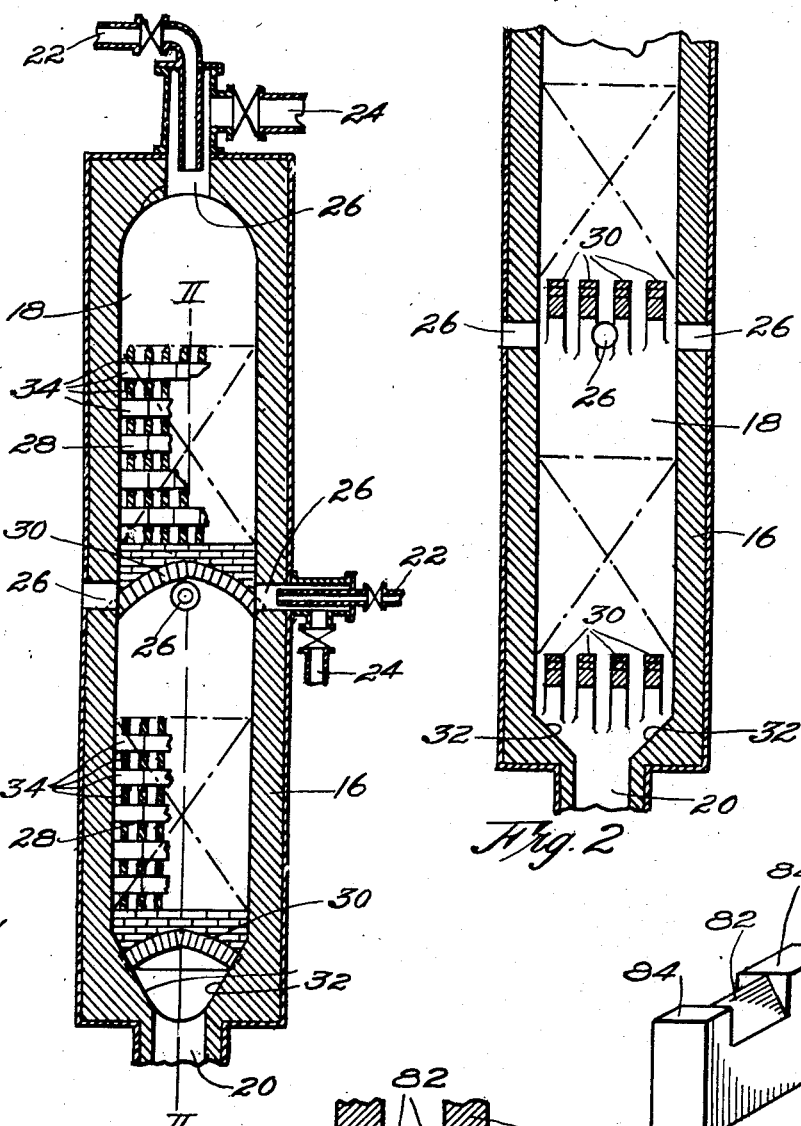
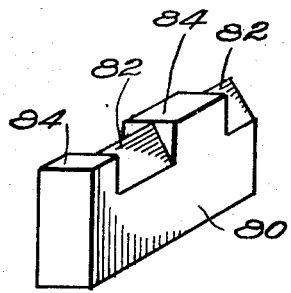
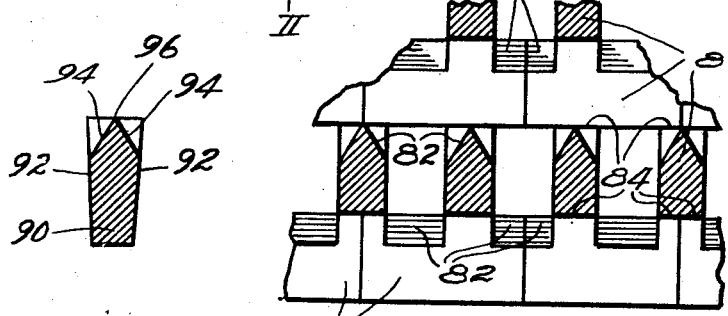
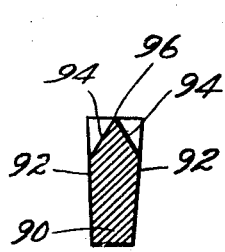
INVENTOR,
Forrest C. Reed.
BY
Hovey & Hamilton,
ATTORNEYS.

Nov. 13, 1934.  F. C. REED  1,980,827
APPARATUS FOR THE PRODUCTION OF CARBON BLACK
Filed April 8, 1931   3 Sheets-Sheet 2

INVENTOR,
Forrest C. Reed.
BY
Hovey & Hamilton,
ATTORNEYS.

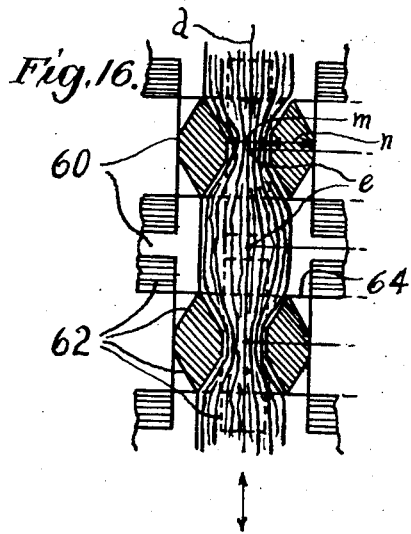
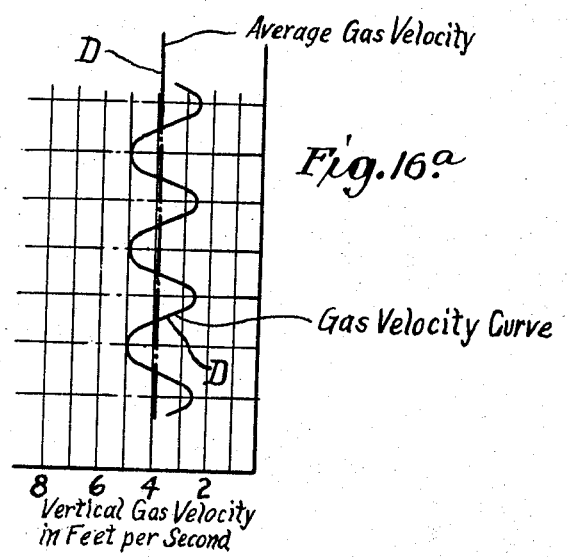
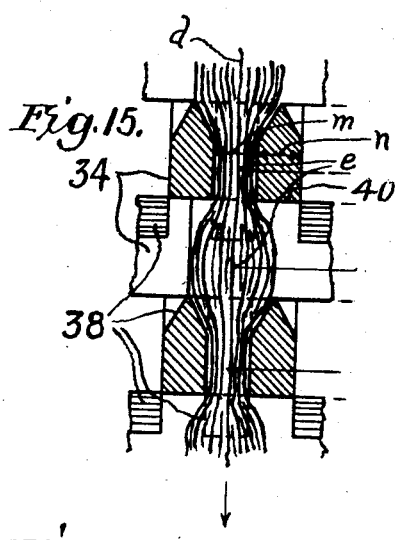
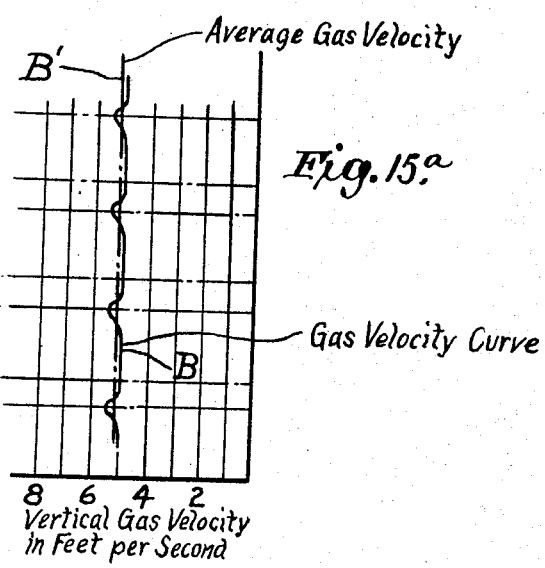
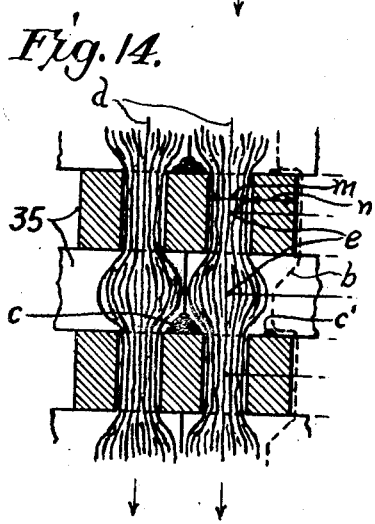
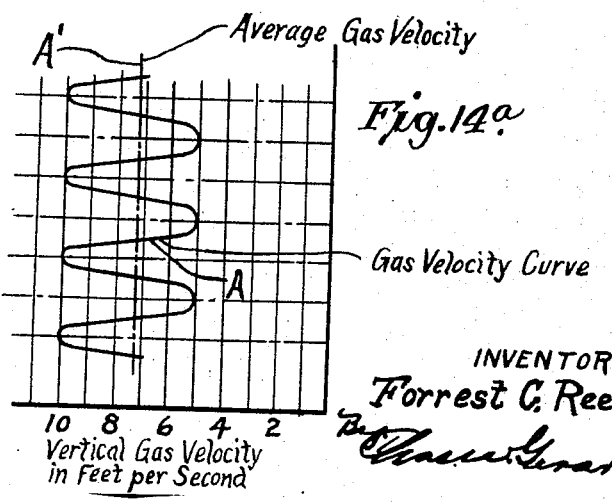

Patented Nov. 13, 1934

1,980,827

UNITED STATES PATENT OFFICE 1,980,827

APPARATUS FOR THE PRODUCTION OF CARBON BLACK

Forrest C. Reed, Kansas City, Mo.

Application April 8, 1931, Serial No. 528,576

13 Claims. (Cl. 134—60)

This invention relates to the recovery of carbon black from processes involving the thermal dissociation of hydrocarbons for the production of carbon black and gases, and the primary object of the invention is to provide a novel and improved construction for not only effecting a much more highly efficient action in the recovery of far greater percentages of the carbon black than is possible with the usual type of apparatus, but also for obtaining a carbon black product of uniformly superior quality.

To this end the present invention provides an apparatus in which the construction is so arranged as to afford no abrupt contacting surfaces or opportunity for the effective lodgment of the carbon upon the structural parts during the dissociation period, and thus effectively prevent any substantial separation of carbon from the gas and the subsequent sintering action thereof throughout its entire passage through the dissociation chamber.

For accomplishing these purposes an apparatus is provided in which at least all the interior heating surfaces of that part of the dissociation chamber where actual dissociation begins are purposely arranged so as to entirely avoid positioning any of those surfaces with reference to the gas flow in such a relation as to favor abrupt contact and separation of carbon (a principle directly opposite to that of the former incomplete combustion processes), or to form any pockets or recesses wherein the carbon might be trapped and collected; in addition to which, the contour of these interior heating surfaces is so designed as to cooperate in the formation of passages adapted to promote such a movement of the gas as will not only keep those surfaces swept clean of all material having any tendency to collect thereon, but also maintain the carbon in a finely divided state and hence in that condition most favorable for keeping it constantly moving along with the gas. The invention therefore contemplates an improved type of checker brick for carbon black apparatus, of a character appropriate for effecting the aforesaid results, and also a dissociation chamber having its outlet portion adapted to cooperate in maintaining the proper free movement of the carbon throughout the chamber.

Figure 1 is a vertical central section through the retort of one type of carbon black recovering apparatus suitable for embodying a special form of checker brick structure made in accordance with this invention.

Fig. 2 is a fragmentary diagrammatical section through the retort illustrated in Fig. 1, taken along line II—II of Fig. 1.

Fig. 11 is a perspective view showing another form of the unit.

Fig. 12 is a fragmentary vertical section through checker work built up of units as shown in Fig. 11.

Fig. 13 is a vertical central section through a refractory unit having sides disposed out of parallel relation to each other.

Fig. 14 is a detail sectional view of a common form of checkerwork with flow lines representing the gas movement, and Figure 14a represents a curve showing the variation in gas velocity thru checkerwork.

Figure 7:
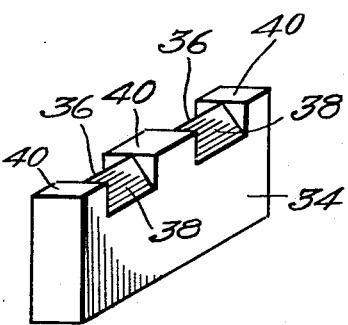
Fig. 7 is a vertical section through the form of unit illustrated in Fig. 5.
Figure 5:
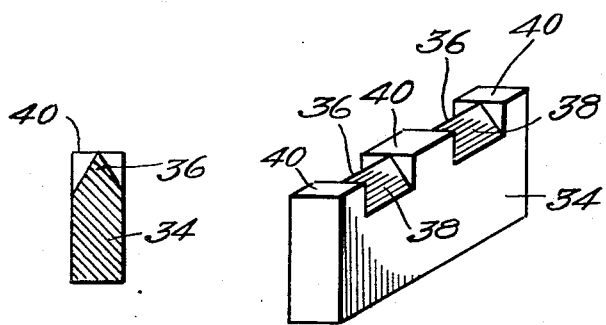
Fig. 5 is a perspective view of a checker work unit embodying a design contemplated by the present invention.
Figure 9:
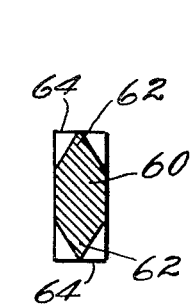
Fig. 9 is a vertical cross section through the unit illustrated in Fig. 8.
Figure 8:
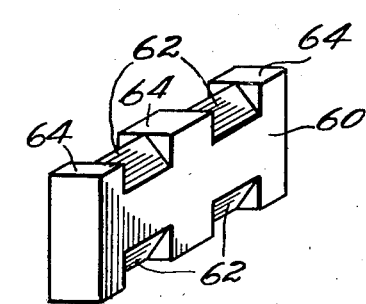
Fig. 8 is a further modification of the invention as embodied in a unit of refractory material suitable for use in carrying out the present invention.

Fig. 15 is a similar view illustrating the sweep of gas over a checkerwork comprising units of the type shown in Figures 5 and 7, and Figure 15a represents a curve showing the variation in gas velocity thru checkerwork, and Fig. 16 is a similar view illustrating the sweep of gas over checkerwork comprising units of the type shown in Figures 8 and 9, and Figure 16a represents a curve showing the variation in gas velocity thru checkerwork.

Earlier methods employed in the manufacture of carbon black have used a common form of checkerwork assembly in the dissociation chamber of the apparatus, and these methods I have found to be very inefficient because of the loss of the carbon separated from the gas and subsequently sintered because of the exposed abrupt horizontal surfaces of the rectangular form of checker brick used and also on account of the poor heating contact afforded the gas. The use of such checkerwork resulted in the formation of a multiplicity of abrupt horizontal surfaces or ledges leading off laterally from the path of the gas travel thru the dissociation chamber, and hence created a corresponding number of dead zones or carbon-trapping spaces above and below such surfaces and prevented effective heating contact with the gas. The carbon separated from the gas and collected in these areas was of course not recovered in the cracking process, and the practice has been to either burn all of it by air blast operation, or to convert a part of it to carbon monoxide (as by the use of steam in the ordinary water-gas reaction) and to burn the remainder on the checker brick to produce heat by air blast in the process of heating the checkerwork between successive cracking operations. Such methods are plainly extremely wasteful of the carbon not only because of the carbon which is directly lost, but because of the fact that the carbon remaining in the dissociation chamber is subjected to prolonged heating and sintering action, forming a coarse gritty product which is utterly worthless as carbon black, and by its mere presence does further damage by contaminating the useful carbon product of the cracking operation.

Now it was formerly supposed that carbon stuck to any surface, whether vertical or horizontal, with which it came in contact, and while this may have been true to some extent, I have discovered by a study of actual commercial operation that practically all of the carbon not recovered can be accounted for as having separated from the gas and lodged on abrupt horizontal surfaces and not on vertical surfaces. Furthermore the carbon obtained by the nearly complete dissociation of natural gas as with the present invention is finer and less flocculent than the carbon obtained by the incomplete combustion methods and has little tendency to adhere to vertical surfaces, but any abrupt contact with any surface will cause the carbon to separate from the gas then its quality is destroyed by the subsequent sintering.

It is known from the actual commercial operation of the thermal gas cracking processes that the loss of carbon prematurely separated from the gas and deposited in the rectangular form of checkerwork amounts to about two-thirds of the free carbon from hydrocarbons completely or nearly completely dissociated, a large part of the remaining one-third of the free carbon is recovered, and in addition to the loss of carbon in checkerwork, there is some deposit and loss between the checkerwork and exit of cracking apparatus because of the low gas velocity at this point. With lean gas, the carbon recovered may amount to from 6 to 8 pounds per 1000 cubic feet of gas cracked, while the loss may amount to from 12 to 16 pounds or more. It is obvious that a certain quantity of carbon is required to fill up the checkerwork with each dissociation period, therefore, the less the extent of dissociation, the less will be the surplus of carbon for recovery above that required to fill up the checkerwork. In fact it has been demonstrated from actual commercial operation that the extent of dissociation can be reduced to a point where there will be little if any carbon recovered.

When carbon is burned in checkerwork for heating purposes, a fundamental economical loss is involved from the very fact that the carbon thus consumed is inherently far more valuable as carbon black, if possible to be recovered as such, than as a fuel for said heating purposes. Commercial carbon black is worth at least $80 per ton, whereas, in the operation of city gas plants, the coarse gritty carbon recovered with otherwise valuable carbon in the usual wash-box following the cracker and used for boiler fuel is worth only about $4 per ton. But even the carbon burned off the checkerwork by the air blast is far more expensive (and therefore constitutes a correspondingly great waste) than if gas alone were used for the required heating of checkers. For if the value of the carbon be conservatively rated at only 2¢ per pound, and the leanest natural gas at 10¢ per 1000 cubic feet,—1 lb. of carbon develops 14,500 B. t. u.'s.=7,250 B. t. u.'s. for 1¢, 1000 cu. ft. of gas develops 1,009,000 B. t. u.'s.= 100,900 B. t. u.'s. for 1¢, from which it appears that carbon is at least 14 times as expensive for heating purposes as natural gas.

Some ineffective efforts have been made to overcome the disadvantages arising from the practices above referred to, from attempts involving a decrease in the extent of heating surfaces presented by the bricks, to other attempts to dispense with the use of checkerwork altogether, as e. g., in processes and apparatus using externally heated retorts or depending on the incomplete combustion, with air, of the hydrocarbons. The objections to these methods are due to the inefficiency and incompleteness of the cracking operation and consequently low carbon black production, and their extravagance in the consumption and waste of gas has led to prohibitory legislation in some sections. While most of these efforts proceeded on the assumption that a good grade of carbon black could be produced only at relatively low temperatures, with incomplete combustion, with air, of the hydrocarbons, I have found that it is possible to produce a good grade of carbon black at high temperatures, with complete or nearly complete dissociation, just so long as the carbon is protected from the sintering action such as occurs with the common form of rectangular checker brick. The correct solution, therefore, of the various difficulties which have been heretofore experienced in this work, is to maintain such a condition of the carbon, as by keeping it in a finely divided state and continuously floating along with the cracked gas, that it will not be subjected to any sintering action, regardless of the high temperatures maintained for the cracking action, provided the gas is kept moving at a reasonably high velocity and from abrupt contact with high temperature surfaces. The means devised for accomplishing these results will now be described in detail.

Figs. 1, 2, 3, 4, 5 and 7 show an advantageous form of the invention and reference to these diagrammatical illustrations will first be made to disclose the manner of building checker work into carbon black apparatus to prevent objectionable abrupt contacting and collecting surfaces within the dissociation chamber.

Apparatus best adapted to embody features of this invention includes a retort 16, wherein is formed a dissociation chamber 18, from which leads an outlet 20. Intakes 26 entering chamber 18 are disposed above outlet 20 and in this particular instance heating and dissociating are performed in a downward direction; that is to say, the flow through chamber 18 is from points above outlet 20 downwardly thereto.

Each intake 26 may have a conduit 22 for the introduction of suitable hydrocarbons, and a pipe 24 to allow the entrance of air to chamber 18. Any number of well known valves might be interposed in either conduit 22 or pipe 24 and the ratio of hydrocarbons and air controlled thereby.

In the example shown, the height of retort 16 is sufficient to allow the introduction of two distinct sets of checker work 28. Each set of checker work 28 is supported by suitable arches 30 anchored to retort 16, and both checker work 28 and arches 30 are built of refractory material and each is formed of blocks or brick as shown.

To accomplish one of the objects of the invention, retort 16 has its bottom specially formed to provide a rapidly increasing velocity of gases toward outlet 20. Outlet 20 need not be in axial alinement with chamber 18 but may be disposed at any point so long as a rapidly increasing velocity of gases is provided. The angled sides and bottom surfaces 32 are positioned between the lower arches 30 and outlet 20 and effectively cooperate with the unique checker work 28 as later disclosed.

Sides 32 converge as outlet 20 is approached, and the velocity of issuing gases thereby increased to positively carry carbon black from the chamber 18.

Figure 3:
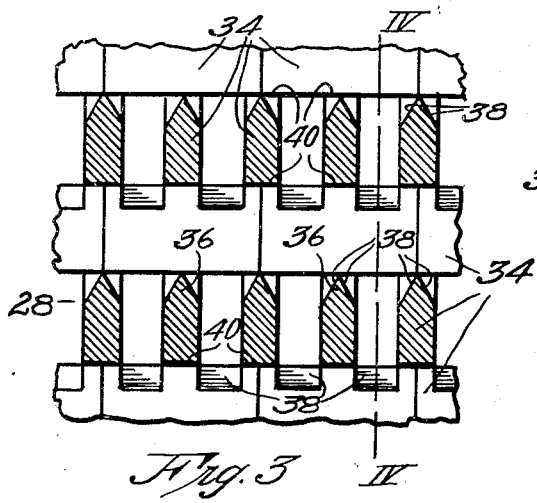
Fig. 3 is a fragmentary vertical section through checker work built of units formed in accordance with this invention.
Figure 4:
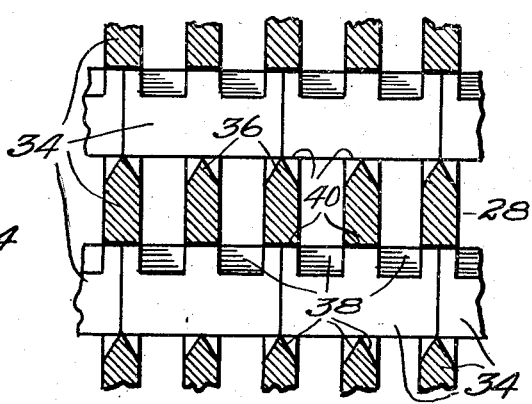
Fig. 4 is a similar section taken along line IV—IV of Fig. 3.

Checker work 28, illustrated in Fig. 1, is constructed of units 34, formed as illustrated in Fig. 5. The outside dimensions of unit 34 might be substantially the same as any ordinary fire brick, but it is possible, and perhaps an advantage, to form these units with a width that is greater than twice the thickness thereof. In so doing, it is obvious that a fewer number of units 34 and therefore less horizontal surface will be necessary per given height of checker work 28. Checker work 28, as shown in the drawings, is built to present what are commercially known as straight flues. To one skilled in the art, it is plain that the units of this invention might be built into checker work built up in a staggered relation to present staggered or offset flues. The straight flue feature is best illustrated in Figs. 3 and 4, wherein the path of travel therealong is between units 34, which are cross sectioned.

With respect now to the specific structure of unit 34. One edge thereof is provided with wedge-shaped portions 36 recessed below the normal surface of the edge. Each wedge-shaped portion 36 may comprise an inclined surface 38, disposed at an angle between the vertical and horizontal to prevent abrupt contact with the moving gas column thereby preventing any substantial separation of carbon from the gas and to deflect laterally, particles of material which might strike the surface 38. A plurality of flat surfaces 40, alternating with wedge-shaped portions 36, are formed at the edge of unit 34, upon which may rest like units when building up checker work 28. When a unit of this character is used in the type of apparatus described, the edge thereof, formed as just described, is preferably positioned to oppose the direction of flow through chamber 18. Since flat surfaces 40 are all covered, no horizontal surfaces are presented which oppose the direction of flow through the apparatus. It is, however, obvious that the units 34 will be similarly effective in apparatus where the movement or flow of the gas is upward and the wedge-shaped portion of said unit pointing in the same direction, for the sweep of the gas past the inclined surfaces of said wedge-shaped portion will have the same effect of sweeping them clean, and obviously deposits will have little tendency to collect upon the bottom of the unit in opposition to the pull of gravity.

Figure 6:
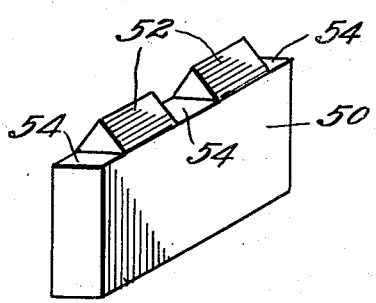
Fig. 6 is a similar view of another form of said unit.

In Fig. 6 is shown a unit 50, having wedges 52 formed on one edge thereof in alternate relation with flat surfaces 54. This modified form forms substantially the same function as the form shown in Fig. 5 and either unit 34 or 50 may have both edges thereof formed as described. As an example of this, Fig. 8 illustrates an additional step in carrying out the formation of a unit similar to the one shown in Fig. 5. In Figs. 8 and 9 unit 60 has each of its opposite edges formed to present a plurality of wedge-shaped portions 62, alternated by flat surfaces 64, upon which may rest the checker work above.

Figure 10:
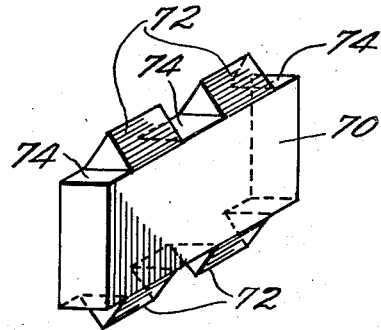
Fig. 10 is a perspective view showing yet a further modification of the unit of refractory material which embodies the features of the instant invention.

Fig. 10 shows a continuation of the idea illustrated in Fig. 6. In this instance, unit 70 has wedge-shaped portions 72 formed on each of its opposite edges and flat surfaces 74 are disposed therebetween for the purpose hereinbefore mentioned.

It may be desirable to build a unit 80 such as illustrated in Fig. 11. If so, the relative position of wedge-shaped portions 82 is slightly altered so that there is such a portion at one end of unit 80. Flat portions 84 are provided and a checker work such as that shown in Fig. 12 may be constructed.

Fig. 13 is a cross section through a unit 90 which has its sides 92 angled out of parallel relation with each other. Inclined surfaces 94 are formed at the wedge-shaped portion 96 in a manner similar to the units before described. Any of the previously mentioned units might be made to present a cross section like that of Fig. 13. If so, the wider portion of the unit should be positioned to oppose the action of gravity through dissociation chamber 18. It is found that a unit formed in this fashion will not collect particles of carbon black on the sides thereof as readily as a unit having parallel sides, and is likewise effective if its narrower edge opposes the direction of flow.

Checker work made up of any of the units described is substantially free from horizontal surfaces making abrupt contact with the moving gas column which would thereby cause the separation of carbon from the gas and its subsequent sintering into a coarse gritty material or solid. The principle of impinging gases during dissociation upon abrupt surfaces to collect carbon, as almost universally used in former incomplete combustion carbon black processes, is the very cause of the sintering and deterioration of carbon black produced in the closed retort of a thermal process using the old style of rectangular checker brick and operating at high temperature because the abrupt contact of the moving gas with the abrupt contacting surfaces causes the carbon to separate from the cracked gas which is followed by the sintering action due to the high temperature of the checkers. Now if such a thermal process were capable of operating at low temperatures, the rectangular checker brick would be an asset in accelerating the separation of the carbon on the abrupt contacting surfaces where it could be easily removed by mechanical means, but because of the high temperature of checker-work actually required, the quality of the carbon thus separated is destroyed. The primary function of the checkerwork of the present invention is, then, not merely to guide solid material thru the checkerwork to an exit, but as previously stated, the real function is to avoid the separation of the carbon from the cracked gas and the subsequent sintering and formation of the coarser carbon particles or solids, because if the carbon does separate from the gas and lodge even temporarily, sintering takes place, and since the damage is then already done, it would be just as well to let the carbon remain on the checkers and utilize it for its heating value during the heating period as was formerly done.

The foregoing will be better understood when it is considered that immediately after the dissociation of a hydrocarbon, the carbon is ultra-microscopic and to all intents and purposes might be considered as a gas until it comes into contact with an abrupt surface (the principle of carbon separation used in former low temperature processes), or is subjected to prolonged heating at which time agglomeration begins and the carbon particles might then be said to take definite size. Since the diameter of a particle of marketable carbon black, even after its production, is less than 0.2 of one micron (1 micron=1/25,000 inch), it is conceivable that the carbon during dissociation is not much different than a gas as long as sintering is prevented. Therefore, one most important function of the novel gas passages of the present invention is one of prevention, i. e., to keep the carbon to the utmost extent in a finely divided state, and this is accomplished by preventing abrupt high temperature contacting surfaces, and at the same time imparting a weaving and sweeping movement to the gas flow whereby all gas contacting surfaces are constantly swept free of carbon. Other important functions contributing to the increased quantity and quality of the carbon produced are, to permit close spacing of checker units in order to give intimate heating contact without any abrupt variation in the velocity of the gas column, and to give improved and increased heat contacting surfaces with uniform time of heat contact thereby increasing the capacity of gas cracking apparatus so that a shorter length of checkerwork with fewer high temperature contacting surfaces of any kind are required for the dissociation of a given volume of hydrocarbons.

The foregoing functions and advantages of the novel gas passages formed by the checker units of the present invention will be obvious from a comparison of Figs. 15 and 16 with Fig. 14 which shows checkerwork constructed of the old type of rectangular units 35, and the variation in gas velocity thru checkerwork is shown in Figure 14a by curve A, and the average gas velocity is shown by dot-dash line A'. Fig. 15 shows checkerwork constructed of units 34 of the present invention, and the gas velocity thru checkerwork is shown in Figure 15a by curve B, and the average gas velocity is shown by dot-dash line B'. Fig. 16 shows checkerwork constructed of units 60 of the present invention, and the gas velocity thru checkerwork is shown in Figure 16a by curve D, and the average gas velocity is shown by dot-dash line D'. For purposes of comparison of Figs. 14, 15, and 16 on an equal basis, the gas velocity at $e$ between the vertical faces of checkers is assumed to be 5 feet per second for the curves of Figures 14a, 15a and 16a. The path of the gas movement, after dissociation has progressed somewhat, is shown by the continuous and partly curved lines $d$ traversing the open spaces between the checker units in Figures 14, 15 and 16.

In Fig. 14, the path of the gas over the former rectangular checker units at the beginning of the dissociation period is indicated by the dotted line $b$ at the right of checker units, from which it will be clearly seen that the abrupt contact of the gas with the top surface of checker units causes the carbon to separate from the gas and to start piling up as indicated at $c'$, the action being identical in principle to that used in former incomplete combustion processes for producing carbon black, excepting that in the present case, the very high temperature of the checkers causes the carbon to start sintering, and the damage increases as the dissociation progresses until the dead zone, created by the gas flow as indicated by the lines $d$, becomes filled as indicated at $c$, the carbon, thus separated from the gas and sintered into coarse particles and worthless as carbon black, representing about two-thirds of the carbon resulting from dissociation. This carbon is removed at the end of each dissociation period by some means such as by combustion with air for heating checkerwork or by steam to produce water-gas, in any event, this loss of carbon is repeated with every dissociation period and the extent of such loss can be realized when it is considered that as many as 50,000 checkers are used in one unit of a commercial gas cracking apparatus.

In Figs. 14, 15, and 16, the space $m$ between the checker units of each course is made equal to the thickness $n$ of checkers, therefore the checker units shown in side view are spaced the same as those shown in cross-section. This is a desirable spacing of checkerwork for the thermal dissociation processes, and the variation in gas velocity will be apparent, as, e. g., in Fig. 14, it will be seen that the area of gas column at the top and bottom edges of checker units 35 is one-half of the area of gas column at $e$ midway between these edges, it is obvious, therefore, that the gas velocity at the top and bottom edges of checker units is double the velocity at point $e$ midway between these edges as shown by the curve A, thus giving very uneven intervals of heating contact and increasing the pressure resistance to gas flow thru checkerwork.

Now referring to Fig. 15, it will be seen that the area of gas column and consequently the gas velocity (see curve B) is practically constant because the recesses 38 at the upper edges of checker units compensate for the otherwise restricted cross-sectional area of gas column. With the type of checker units shown in Fig. 16, it is apparent that the cross-sectional area of gas column at both top and bottom edges of checker units is gradually increased because of the recesses 62 on both edges, therefore, the gas velocity at these points, instead of being abruptly increased as with the common form of rectangular checker units of Fig. 14, is gradually decreased as shown by the gas velocity curve D, and the maximum velocity is no greater than the minimum velocity with the checkerwork of Fig. 14, while the average gas velocity is only 3.8 feet per second as compared to 7.2 feet per second in Fig. 14. Now since the time interval of heat contact varies inversely as the gas velocity, it is obvious that the time of heat contact with the checkerwork of Fig. 16 is nearly double that of Fig. 14, therefore the capacity of the checkerwork of Fig. 16 is nearly double that of Fig. 14, or only about one-half the length of checkerwork would be required for the same capacity, and the number of contacting surfaces would be reduced accordingly thereby further improving the quality of carbon black produced, for it is well known that the best quality of carbon black is that which does not come into actual contact with any surface at high temperature. It is likewise obvious from a comparison of the average gas velocities that the checkerwork of Fig. 15 has about 30% greater capacity than that of Fig. 14. And furthermore, the effective heat contacting surface of the checker units of Figs. 15 and 16 is increased about 25% and 50%, respectively, over that of Fig. 14, and the pressure resistance to gas flow thru checkerwork is greatly reduced because of the reduction in the variation of gas velocity.

From the foregoing comparison of gas velocities it is not to be assumed that the purpose of this invention is to reduce the gas velocity thru the checkerwork, for on the contrary, the increased capacity of checkerwork due to the improved gas passages can as well be utilized by increasing the quantity of gas to be dissociated by a given length of checkerwork.

From Fig. 14, it will be seen that as the spacing between the old style of rectangular checker units is decreased, the restriction in area of gas column at top and bottom edges of checker units is increased, thereby resulting in a still greater variation in gas velocity and consequently a greater unevenness of heating contact. It is therefore obvious, that close spacing of rectangular checker units is inefficient and impractical, while the reverse is true for the novel checkerwork of the present invention. Checkerwork constructed with the type of units shown in Fig. 16 will have as much as 7.0 square feet of effective heating surface per cubic foot of checkerwork as compared with only about 4.6 square feet of effective heating surface with the former rectangular units besides having other advantages as previously described. The advantage of such construction is obvious and when combined with a retort 16 having specially formed angled surfaces 32, the recovery of carbon black is increased to a point where losses by deposition are practically eliminated.

With flat surfaces 40, 54, 64, 74, and 84, built into units embodying this invention, no crushing action is imposed upon the wedge-shaped portions of the unit, and while these flat surfaces are shown as rectangular in the drawings, they could as well be circular or have the corners rounded or beveled.

While the construction described allows introduction of gas and air at either top or mid-way point, it is preferred to inject combustion supporting air for some of the gas entering the top at the mid-way point.

It is therefore apparent that the present invention succeeds in preventing any substantial separation of the carbon from the cracked gas and the subsequent sintering and deterioration thereof during its passage thru the checkerwork, thereby making possible the recovery of that two-thirds of the carbon which was entirely lost by former methods, or in other words producing as much carbon from one-third the volume of natural gas required by such former methods. The apparatus is also adapted for operation at high temperatures for the substantially complete cracking of hydrocarbons to a good grade of carbon black and to hydrogen containing from 5% to 10% or less of methane. This gas is entirely suitable for such processes as the synthesis of ammonia.

It is further obvious that the improved apparatus would also be very efficient in the recovery of carbon black from processes operating at lower temperatures with partial cracking of hydrocarbons to obtain high quality carbon black and for the subsequent recovery of the polymerized products, such as benzol, from the residual gases, or from processes utilizing some air with incomplete combustion during the dissociation period, or utilizing other diluents.

The drawings show the use of the special checker brick in gas cracking apparatus where the flow of gas for both heating and cracking periods is downward; it is apparent, however, that the action of this special brick would be practically equally as effective in gas cracking apparatus where the heating is downward and the cracking is upward, or vice versa, for it is obvious that the use of the improved structure in all cases will keep the carbon floating in a finely divided state with the gas. There are some advantages and disadvantages in all cases; an advantage of the upward cracking is the better separation of the finer carbon from possible contamination with grit, a method of operation which is followed in several commercial p'ants.

While the foregoing sets forth practical and efficient forms of embodiment of the invention and methods of practicing the same, it is recognized that various other modifications and alterations are possible within the scope of the invention without departing from the true and fundamental character of the same, and I desire to be understood as reserving the right to make whatever changes or modifications which may fairly fall within the spirit and scope of the following claims.

Having thus described the invention, what is claimed as new and desired to be secured by Letters Patent is:

1. Apparatus for producing carbon black comprising a dissociation chamber, and a checkerwork construction within said chamber made up of units each having wedge-shaped edges projecting in the direction counter to the general direction of the gas flow for presenting the surfaces exposed to gas contact in an inclined relation to said direction of gas flow.

2. Apparatus for producing carbon black comprising a dissociation chamber, and a checkerwork construction within said chamber made up of checker units, each unit having substantially all of its exposed edge portion which faces the incoming gas flow formed with an inclined surface in position for contact by the gas at an angle of less than ninety degrees to a vertical longitudinal plane through said unit.

3. Apparatus for producing carbon black comprising a dissociation chamber, and a checkerwork construction within said chamber made up of checker units, each unit having substantially all of its exposed edge portion which faces the incoming gas flow formed with an inclined surface in position for contact by the gas at an angle of less than ninety degrees to a vertical longitudinal plane through said unit and its opposite edge portion also having substantially all of its exposed surface inclined at an angle opposite to that of said first surface.

4. Apparatus for producing carbon black comprising a dissociation chamber, and a checkerwork construction within said chamber made up of checker units, each unit having one exposed edge portion enclosed by plane surfaces at an angle to each other and converging to an edge constituting the ridge of said edge portion, at least one of said surfaces being positioned at an angle of less than ninety degrees to a vertical longitudinal plane through said unit.

5. Apparatus for producing carbon black comprising a dissociation chamber, and a checkerwork construction within said chamber made up of checker units each having its exposed and opposite edge portions bounded by plane surfaces at an angle to each other and converging to an edge constituting the ridge of the corresponding edge portion, at least one of the surfaces of each edge portion of each unit being positioned at an angle of less than ninety degrees to a vertical longitudinal plane through said unit.

6. Apparatus for producing carbon black comprising a dissociation chamber provided with an outlet portion, and a checkerwork construction within said chamber made up of checker units, each unit having substantially all of its exposed edge portion which faces the incoming gas flow formed with an inclined surface in position for contact by the gas at an angle of less than ninety degrees to a vertical longitudinal plane through said unit, said outlet portion of said chamber being of converging outline for imparting an increasing velocity to the products of dissociation in the direction of the outlet.

7. Apparatus for producing carbon black comprising a dissociation chamber, and a checkerwork construction within said chamber made up of checker units, each unit comprising a rectangular body having a depth greater than twice its thickness and having substantially all of one of its exposed longitudinal edges formed with a gas contacting surface inclined in position for contact by the gas at an angle of less than ninety degrees to a vertical longitudinal plane through said unit.

8. Apparatus for the production of carbon black comprising a dissociation chamber, and a checkerwork construction within said chamber made up of an assembly of units, each unit having substantially all of an exposed edge portion formed with an inclined surface in position for contact by the gas at an angle of less than ninety degrees to a vertical longitudinal plane through said unit, said units being superposed in such relation as to form gas passages of substantially uniform cross-sectional area.

9. Apparatus for the production of carbon black comprising a dissociation chamber, and a checkerwork construction within said chamber made up of an assembly of units, each unit having substantially all of its opposite and exposed edge portions formed with inclined surfaces in position for contact by the gas at an angle of less than ninety degrees to a vertical longitudinal plane through said unit, said units being superposed in such relation as to form gas passages having their cross-sectional area increasing gradually in the directions of both edges of said units.

10. Apparatus for the production of carbon black comprising a dissociation chamber, and a checkerwork construction within said chamber made up of an assembly of units, each unit having its exposed edge portions formed with gas contacting surfaces restricted solely to areas located at an angle of less than ninety degrees to a vertical longitudinal plane through said unit and thereby preventing any abrupt contact of the products of dissociation with said gas contacting surfaces and the separation of the carbon black from the gas during passage through said checkerwork.

11. Apparatus for the production of carbon black comprising a dissociation chamber, and a checkerwork construction within said chamber made up of an assembly of units, each unit having an edge portion formed with gas contacting surfaces restricted solely to areas located at an angle of less than ninety degrees to a vertical longitudinal plane through said unit, said units being superposed in such relation as to form gas passages substantially free from restriction in cross-sectional area at the edges of the units between successive courses and thereby accommodating gas columns of substantially uniform cross-sectional area.

12. Apparatus for the production of carbon black comprising a dissociation chamber, and a checkerwork construction within said chamber made up of an assembly of units, each unit having substantially all of an exposed edge portion formed with inclined surfaces presented at an angle of less than ninety degrees to a vertical longitudinal plane through said unit, said units being superposed in such relation as to form gas passages of substantially uniform cross-sectional area and thereby offering a minimum resistance to the movement of the gas through said checkerwork.

13. Apparatus for the production of carbon black comprising a dissociation chamber, and checkerwork within said chamber constructed of units arranged in superposed courses and having substantial areas of their exposed edges formed to present heat contacting surfaces in sufficiently inclined relation to the general direction of and facing the gas flow through said checkerwork to diminish restrictions in cross-sectional area of the gas flow passages at the edges of the units between successive courses.

FORREST C. REED.